United States Patent [19]

Collins, Jr.

[11] Patent Number: 4,533,471

[45] Date of Patent: Aug. 6, 1985

[54] SELF-CLEANING LIQUID FILTER AND SYSTEM

[76] Inventor: Henry R. Collins, Jr., P.O. Box 382, Livingston, Tex. 77351

[21] Appl. No.: 523,876

[22] Filed: Sep. 12, 1983

Related U.S. Application Data

[63] Continuation of Ser. No. 325,928, Nov. 30, 1981, abandoned.

[51] Int. Cl.³ .............................................. B01D 29/38
[52] U.S. Cl. .................................. 210/138; 210/254; 210/333.01; 210/411; 210/433.1
[58] Field of Search ................... 210/138, 409, 433.1, 210/434, 411, 254, 334, 333.01

[56] References Cited

U.S. PATENT DOCUMENTS

| | | | |
|---|---|---|---|
| 503,597 | 8/1893 | Hanks | 210/433.1 |
| 1,062,942 | 5/1913 | Woods | 210/433.1 |
| 1,477,947 | 12/1923 | Ensign | 210/434 |
| 1,546,199 | 7/1925 | Capra | 210/254 |
| 1,549,933 | 8/1925 | Tuomey | 210/254 |
| 2,258,063 | 10/1944 | Meyer | 210/433.1 |
| 2,859,874 | 11/1958 | Stearns | 210/409 |
| 2,868,382 | 1/1959 | Best | 210/409 |
| 3,501,012 | 3/1970 | Ryan | 210/433.1 |
| 3,598,238 | 8/1971 | Collins, Jr. | 210/138 |

*Primary Examiner*—John Adee
*Attorney, Agent, or Firm*—Guy E. Matthews

[57] ABSTRACT

The invention is directed to a self-cleaning liquid filter of the type which includes a filter element through which a liquid sample is selectively passed which is taken from a stream of liquid which flows past one side of the filter element. The filter includes a housing with an inlet, a bypass outlet and a filter outlet. A filter element is mounted in the housing between the inlet and filter outlet and the inlet and bypass outlet communicate with each other through a chamber on the inlet side of the screen, the chamber extending around the inlet. The inlet is positioned in close proximity and oriented relative to the filter element so that liquid entering the housing through the inlet will hit the filter element at a right angle so that when the flow of liquid through the filter outlet is blocked all of the liquid will reflect off of the filter element and outwardly into the chamber for washing off particles on the inlet side of the filter element.

6 Claims, 3 Drawing Figures

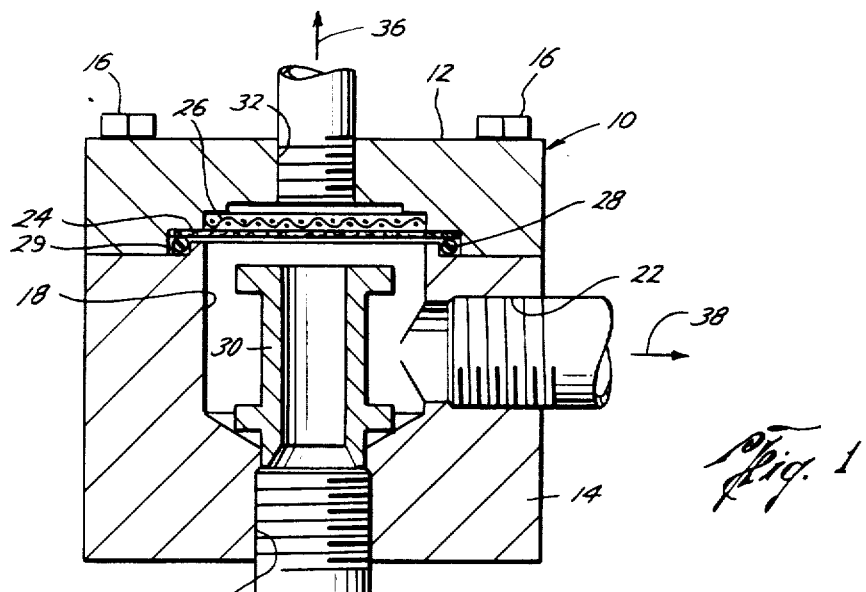
*Fig. 1*
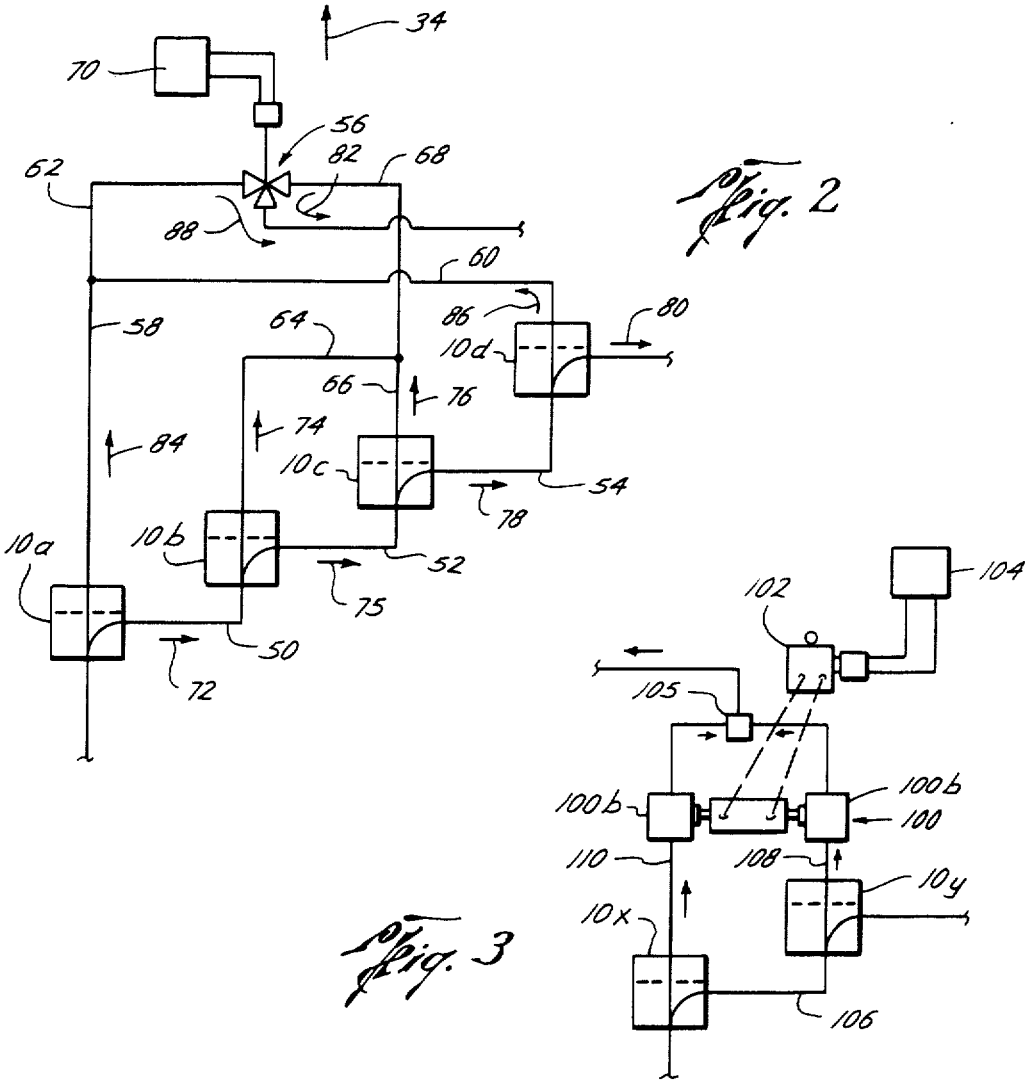
*Fig. 2*
*Fig. 3*

4,533,471

SELF-CLEANING LIQUID FILTER AND SYSTEM

BACKGROUND OF THE INVENTION

This is a continuation of application Ser. No.: 325,928, filed Nov. 30, 1981, now abandoned.

This invention generally relates to self-cleaning filters and, more particularly, to bypass filter which utilizes liquid flowing through the filter to clean the filter element.

This invention is an improvement over the subject matter of U.S. Pat. No. 3,598,283 in which the named inventor is also the inventor of the invention described and shown herein. All of the subject matter of that patent is incorporated herein as though it were fully set forth.

The subject invention is broadly directed to self-cleaning filters of the type where liquid which is being filtered is used to clean off particles which have collected on the filter element. Filters of this type have been used in sample analyzers such as the one shown and described in the United States patent mentioned above and incorporated herein.

In that type of system liquid is transmitted through a sampling circuit where two or more filters are arranged in parallel and liquid is permitted to flow through one filter at a time to a sample analyzer while the other filter is engaged in a self-cleaning operation. A timer is connected to a valve through which the filter outlet of each of the filters is connected for alternately blocking the outlets of the filters so that one can be cleaned while sampling fluid flows through the other one. As discussed in conjunction with FIG. 3 of the above-mentioned patent, a limited back-flushing system can be utilized in conjunction with the valve and cylce timer for more thoroughly cleaning the filter elements.

A problem encountered with these types of systems is that the filter elements which are used are too fine and flimsy to effectively be back-washed and the self-cleaning action of prior art filters has proven to be less than satisfactory.

SUMMARY OF THE INVENTION

A liquid filter has been developed in accordance with the invention which is effectively self-cleaning without requiring extensive back-washing. The filter includes a housing formed of two sections which can be connected to each other. An inlet and bypass outlet communicate with a chamber formed in one of the sections. A filter element is positioned over the chamber on the side opposite the inlet. A tubular extension plug is mounted in the chamber for extending the inlet to where the end of the extension is in close proximity to but spaced apart from the inlet side of the filter element, the chamber extending around the extension so that liquid flowing through the inlet hits the screen, washing particles off the filter element and deflecting radially outwardly into the chamber. The liquid and washed-off particles leave the chamber through the bypass outlet.

A filter outlet is formed in the second housing section adjacent to the screen and aligned with the inlet extension. When the filter outlet is not blocked, a portion of the liquid flows directly from the inlet extension through the screen and into the filter outlet to a sample analyzer.

In an overall system of the type in which filters such as the one discussed above can be used, two or more filters can be arranged in parallel so that the bypass outlets of all but the last filter are connected to the inlet of the next succeeding filter. The filter outlets of one or more of the filters are connected to one side of a solenoid valve and the filter outlets of one or more other filters are connected to the other side of the valve.

A cylcle timer is connected to the valve so that it will alternately block the filter outlets connected to one side of the valve so that fluid can operate to wash off any particles which have collected on the filter elements of those filters and then be exhausted through their respective bypass openings. When the timer completes a portion of its cycle, the valve is automatically reversed so that fluid flows through the filter outlets of the filters which have had their elements cleaned before the valve was reversed. Liquid which flows through the unblocked side of the valve is transmitted downstream to a fluid analyzer in a way which is known in the art and will not be described in detail.

As described in conjunction with FIG. 3 of the U.S. Pat. described above, a piston arrangement can be provided in conjunction with the valve and sample analyzer described above which operates to induce a limited back-wash through the filter elements whose outlets are blocked for dislodging particles and assisting in the cleaning process.

A self-cleaning filter is thus provided which operates to clean filter elements more effectively than known in the prior art.

BRIEF DESCRIPTION OF THE DRAWINGS

A better understanding of the invention can be obtained when the detailed description of preferred embodiments set forth below are considered in conjunction with the appended drawings, in which:

FIG. 1 is a cross-sectional view of a filter designed in accordance with the invention;

FIG. 2 is a schematic diagram of a system in which four of the filters of FIG. 1 are utilized; and FIG. 3 is a schematic diagram of a system where two of the filters are utilized in conjunction with a limited back-washing apparatus.

DETAILED DESCRIPTION OF PREFERRED EMBODIMENTS

FIG. 1 shows a filter generally designated by reference numeral 10 which includes housing sections 12 and 14 which are connected by appropriate bolts 16. A chamber 18 is formed in the lower section 14, a liquid inlet 20 and bypass outlet 22 communicating with the chamber 18. A filter element 24 is mounted around the upper edge of the chamber 18, a filter support screen 26 being placed over the filter element 24 for supporting and protecting the filter element 24. The filter element 24 can be formed of a membrane, stainless steel mesh or the like and have openings which are about 0.45 micron in size. An O-ring 28 is mounted in a groove 29 formed between the upper side of the section 14 and the lower side of the section 12 and operates to hold the filter element 24 and screen 26 in place and prevent liquid from leaking between the housing sections 12 and 14.

As shown in FIG. 1, plug or sleeve 30 is mounted in the inlet 20, the end of the extension projecting to an annular clearance of ⅛-¼" between the end of sleeve 30 and the face of filter element 24. A filter outlet opening 32 is formed in the housing section 12 directly adjacent the screen 26 and aligned with the inlet 20 and inlet extension 30. The filter outlet 32 as well as the inlet 20 and bypass outlet 22 are internally threaded so that appropriate liquid lines can be connected to the filter 10.

When liquid flows through the inlet as indicated by arrow 34, a portion of it passes through the filter element 24, screen 26 and filter outlet 32 to a fluid analyzer (not shown) as indicated by arrow 36. The remaining liquid flows across the face of filter element 24 through the above-mentioned ⅛-174 " annular clearance; then through the annular chamber 18 and out the bypass outlet 32 as indicated by arrow 38. When the flow of liquid through the outlet 32 becomes blocked, as described in detail below, all the liquid flows across the face of filter element 24 through provided clearance, and out through the annular chamber 18 and the bypass outlet 22. As clearly shown in FIG. 1, when liquid flows out of the tubular extension plug 30, it first hits the filter element 24 at a right angle, then flows parallel to and across the surface of filter element 24 as confined by the annular clearance. The reduced flow area through the annular clearance increases flow velocity to insure turbulent flow of the liquid across the face of filter element 24. Such flow continous from the annular clearance into the annular chamber defined between the walls of chamber 18 and extension 30. When flow through the outlet 32 is not blocked, some of the liquid flows through the outlet 32 while the rest deflects through the clearance off of the filter element 24 and flows radially outwardly into the chamber 18, washing some particles off of the filter element 24. When flow through the outlet 32 is blocked, all of the liquid deflects across the filter element and flows rapialy into the chamber 18, operating to wash particles off of the filter element for a relatively thorough cleaning. Turbulent flow enhances the cleaning action. Although the filter element 24 is too flimsy to accomodate a high pressure back flushing, a limited back-flushing described below can be used to dislodge particles which cannot be washed off of the filter element 24.

Two or more of these filters can be used in a system similar to the one shown and described in U.S. Pat. No. 3,598,238. Such a system is shown in FIG. 2 where four filters are provided which are indicated by reference numerals 10a, 10b, 10c and 10d. Although the filters are shown schematically, it should be understood that they are of the same design as the one shown in FIG. 1. As shown, the bypass outlet of the filter 10a is connected through a conduit 50 to the inlet of the filter 10b. The bypass outlet of the filter 10b is connected through a conduit 52 to the inlet of the filter 10c, and the bypass outlet of the filter 10c is connected through a conduit 54 to the inlet of the filter 10d.

The filter outlets of the filters 10a and 10d are connected to a solenoid valve 56 through conduits 58 and 60, respectively, which are connected at a T-connection to a conduit 62. The filters 10b and 10c are connected to the other side of the solenoid valve 56 throuh condiuts 64 and 66 which are connected to a conduit 68 through an appropriate T-connection.

A timer 70 is connected to the solenoid valve 56 so that it can alternately be switched at timed intervals to block flow of liquid through the filter outlets of the filters connected to the sides of the valves 56, one at a time. For example, when the solenoid valve 56 is switched to block liquid flow from the filter outlets of the filters 10a and 10d, all the liquid flows through the inlet of the filter 10a flows through the conduit 50 as indicated by arrow 72. However, some of the liquid flows through the filter outlet of the filter 10b into the conduit 64 as indicated by arrow 74. Liquid also flows into the conduit 52 as indicated by arrow 75 to the filter 10c where some of the liquid flows into the conduit 66 as indicated by arrow 76. The remainder of the liquid flows through the bypass outlet of the filter 10c and conduit 54 as shown by arrow 78 into the filter 10d and, since the filter outlet is blocked by the solenoid valve 56, all of the remaining liquid flows out through its bypass outlet as indicated by arrow 80.

In this position of the solenoid valve 56, the filter elements for the filters 10a and 10d are washed by the liquid while it flows through the filter outlets for the filters 10b and 10c, through the solenoid valve 56 and into a fluid analyzer (not shown) as indicated by arrow 82. When the timer automatically switches the solenoid valve 56 so that the filter outlets of the filters 10b and 10c are blocked and liquid flows through the filter outlets of the filters 10a and 10d into the conduits 58 and 60 as indicated by arrows 84 and 86, respectively, and to the analyzer as indicated by arrow 88, liquid which flows through the filters 10b and 10c operated to wash the filter elements in those filters.

FIG. 3 shows an arrangement where the filters are used in system similar to the one shown in FIG. 3 of U.S. Pat. No. 3,598,238, which includes a limited back-flushing system. As shown, filters 10x and 10y are connected to opposite sides of a valve and limited back-flushing apparatus 100 which is operated by compressed air supplied by a generator 102 which, in turn, is controlled by a timing device 104. Such an arrangement is shown and described in greater detail in U.S. Pat. No. 3,598,283 and accordingly will not be described in detail here other than to mention that instead of using a solenoid valve in the back-flushing system a manifold 105 which is about 1¼" square and 2" long is provided and two inlet conduits leading to it and the outlet conduit are all ⅛"in diameter. The relatively small diameter of the conduits provides a back pressure effect which eliminates the need for the solenoid valve.

When, for example, a piston 112b of a double-ended air cylinder 114 is in a cavity 100b, a cavity 100a fills with filtered liquid. The cavities each hold about 10 cc of fluid. The excess filtered liquid flows through conduit 108a to the apparatus 105 and to the analyzer (not shown). Filtered liquid is also flowing through a conduit 110, the cavity 100b (constructed by the piston 112b), to the apparatus 105 and the analyzer. Backflushing occurs when the timer 104 operates the apparatus 102 and switches air flowing to the air cylinder 114. The right side piston 112a, then moves to displace the liquid in the cavity 100a, at a rapid rate forcing most of the 10 cc of filtered liquid in the cavity 100a back through the conduit 108, the filter element 10y and into the conduit 106. this backflow action cleans the filter elements by dislodging particles on the upstream side of the filter surface. Filtered liquid now fills the cavity 100b with excess going through appartus 105 to the analyzer so backflushing can be repeated when the pistons 112a and 112b are moved again.

Filter elements with micron sizes from 1 micron to 10 mesh screen may be used in the backflow system provided they are supported to withstand the backflow pressures. Filter elements with any suitable micron rating may be used in the non-backflow filter applications. It should be noted that about 2-6 gal/min. of liquid flows through the line 106 and about 100-200 cc/min. through the filter which is open and to the analyzer.

The filter described above is more effectively self-cleaning than those in the prior art so that systems in which the filters are used, such as fluid sampling arrangements described in detail, can be operated for relatively long periods of time without replacing filter elements or cleaning the filters.

The foregoing disclosure and description of the invention are illustrative and explanatory thereof, and various changes in the size, shape and materials as well as in the details of the illustrated construction may be made without departing from the spirit of the invention and all such changes are contemplated as falling within the scope of the appended claims.

I claim:

1. A self-cleaning liquid filter combination, comprising;
   (a) a housing having a first section connected in fluid sealed relationship with a second section;
   (b) said first section defining a cylindrical chamber and a fluid inlet disposed at a first end of said cylindrical chamber in axial alignment with said chamber;
   (c) said first section defining a fluid bypass outlet disposed outwardly through the wall of said cylindrical chamber;
   (d) said second section defining a fluid outlet disposed in axial alignment with said cylindrical chamber and said inlet;
   (e) said first section and said second section cooperatively defining a fluid sealed mount for a flat filter element disposed across the second end of said cylindrical chamber;
   (f) a hollow tubular extension member axially mounted within said cylindrical chamber and extending from said first end of said cylindrical chamber to close proximity with the surface of said filter element to define an annular flow clearance between said filter member and said filter surface;
   (g) said extension member defining an annular chamber within said cylindrical chamber; and
   (h) said combination defining flow communication through said inlet, said extension member, said filter element and said outlet and supplemental flow communication through said inlet, said extensiom member, said annular clearance across said filter surface, said annular chamber and said bypass outlet.

2. The combination of claim 1 wherein said annular flow clearance is a distance small as ⅛" between said extension and said filter surface.

3. A system which includes a plurality of self-cleaning filters as specified in claim 1, the system comprising:
   (a) the bypass outlet of a first filter connected to the inlet of a second filter;
   (b) the filter outlet of both filters connected to a valve which can selectively block the filter outlet of one of the filters and allow liquid to flow through the other filter outlet, timing means for operating the valve so that liquid can alternately flow through the filter outlet of the filters for a predetermined length of time while the screen of the other filter is being cleaned.

4. The system of claim 3, and further including means for back-flushing liquid through the screen of the filter whose filter outlet is blocked.

5. The system of claim 3, wherein a plurality of filters are connected so that the bypass outlet of all but the last filter is connected to the inlet of another filter, the filter outlets of a first plurality of the filters being connected to one side of the valve and the filter outlets of a second plurality of the filters being connected to the other side of the valve.

6. the system of claim 5, wherein four filters are provided, the first and fourth filters being connected to one side of the valve and the second and third filters being connected to the other side of the valve.

* * * * *